Patented May 23, 1950

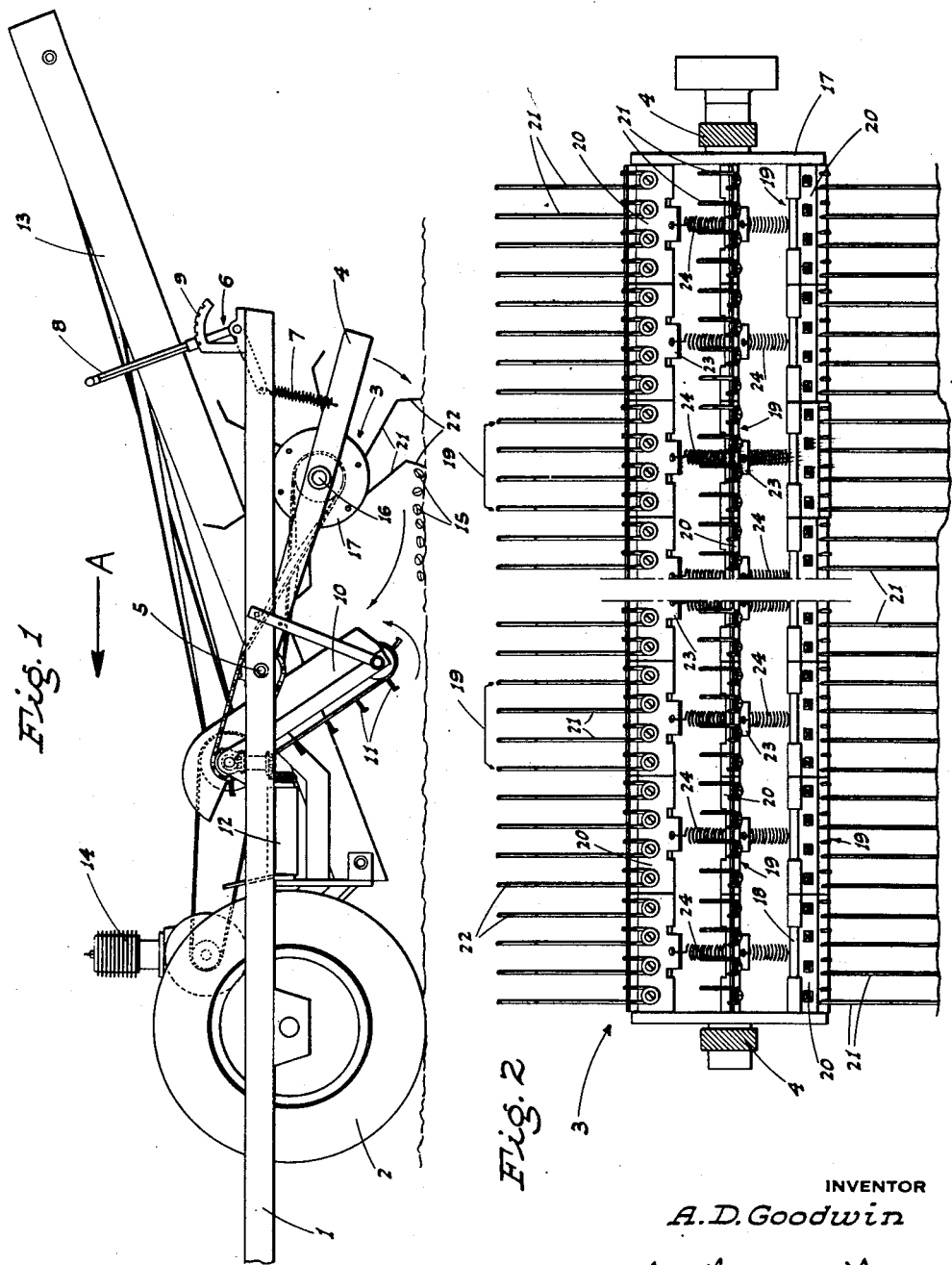

2,508,454

UNITED STATES PATENT OFFICE 2,508,454

NUT PICKUP MACHINE

Alfred D. Goodwin, Manteca, Calif.

Application December 21, 1948, Serial No. 66,467

1 Claim. (Cl. 56—328)

This invention is directed to, and it is an object to provide, a novel machine for picking up or gathering nuts from the ground.

Another object of the invention is to provide a nut pick-up machine which includes a rotary sweep, of novel design, operative upon advance of the machine to deliver nuts from the ground onto a receiving conveyor.

A further object of the invention is to provide a nut pick up machine, as above, wherein such rotary sweep acts to flip or flick the nuts off the ground and onto said receiving conveyor.

An additional object of the invention is to provide a nut pick up machine, as in the preceding paragraphs, wherein the rotary sweep is self-conforming to ground contours so as to assure of maximum efficiency of the machine and a high percentage of nut recovery.

It is also an object of the invention to provide a nut pick-up machine which is designed for ease and economy of manufacture.

A further object of the invention is to provide a practical and reliable nut pick-up machine, and one which will be exceedingly effective for the purpose for which it is designed.

These objects are accomplished by means of such structure and relative arrangement of parts as will fully appear by a perusal of the following specification and claim.

In the drawings:

Fig. 1 is a side elevation of the machine embodying the novel rotary sweep.

Fig. 2 is an enlarged front elevation of said rotary sweep as in operation.

Figure 3:
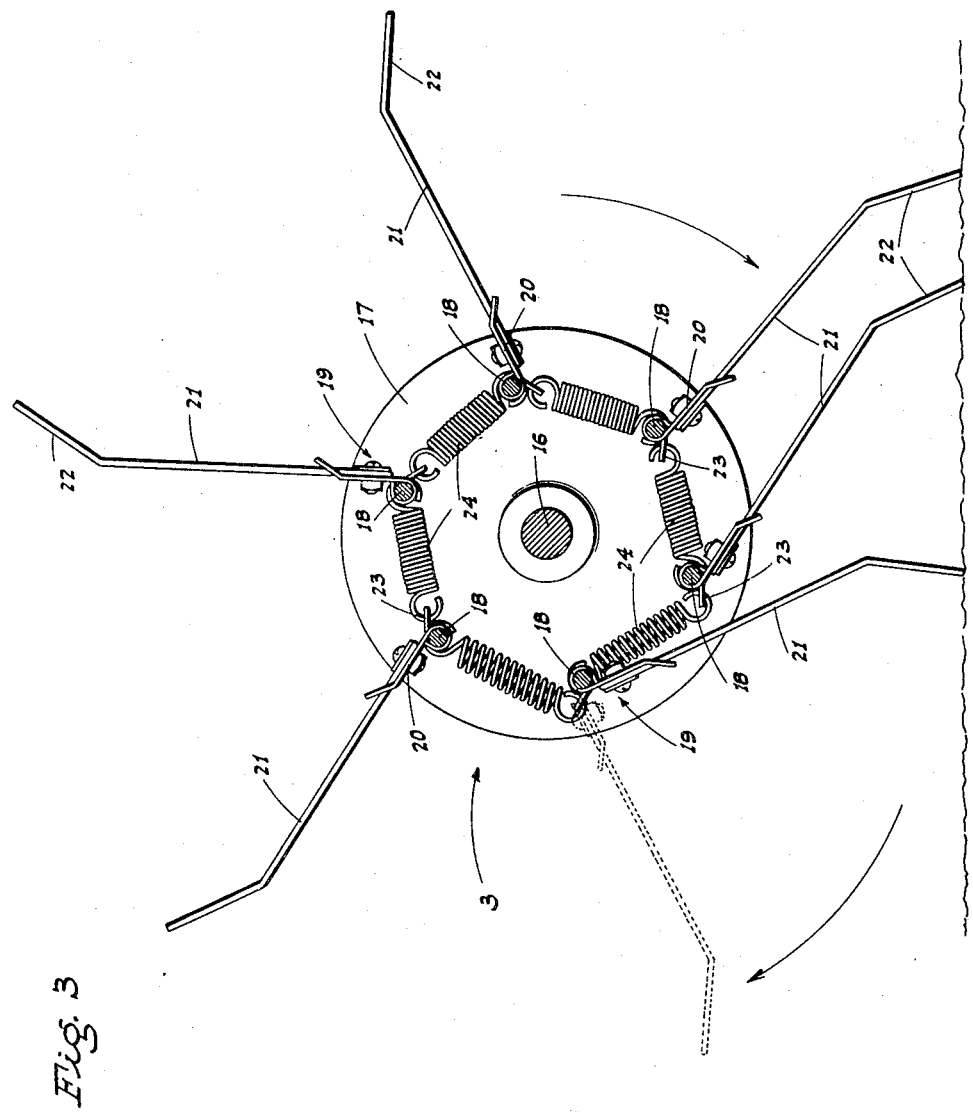
Fig. 3 is an enlarged cross section of the rotary sweep as in operation.

Referring now more particularly to the characters of reference on the drawings, the invention is here embodied in a machine which comprises—in general assembly—a main frame 1 supported for movement along the ground by means including transversely spaced, pneumatic tire wheels 2. The main frame 1 may be part of a self-propelled vehicle or a trailer frame.

The machine is intended to travel in the direction indicated by the arrow A in Fig. 1, and rearwardly of the wheels 2 such machine includes a rotary sweep, indicated generally at 3; such sweep being journaled in a swing frame 4 which extends at a downward and rearward incline from a pivotal axis 5 on the main frame, whereby said rotary sweep 3 is drawn along the ground.

In order to vertically adjust the swing frame 4, to control the engagement of the rotary sweep 3 with the ground, a bellcrank lever assembly 6 is mounted on the main frame 1; there being a spring or other link 7 connected between said bellcrank lever assembly and the swing frame 4, and said assembly including an upstanding hand lever 8 releasably and adjustably latched to a notched quadrant 9.

The rotary sweep 3 is driven in a direction so that the lower portion of such sweep travels in the same direction as the direction of travel of the machine.

Intermediate the rotary sweep 3 and the wheels 2, the machine includes an upwardly and forwardly inclined nut receiving conveyor 10 having cross cleats 11; such nut receiving conveyor being driven with the upper run thereof traveling upwardly. At its lower end the nut receiving conveyor 10 is disposed close to, but spaced from the ground.

The conveyor 10 delivers onto a cross conveyor 12, and in turn the latter feeds to an upwardly and rearwardly inclined elevator conveyor 13, which may lead to a sacking device or to a bin-type trailer.

An engine 14 is mounted on the main frame 1 and drives the rotary sweep, and the conveyors 10, 12, and 13, through the medium of suitable drives, which may be of any generally conventional type, as shown.

With advance of the machine along the ground, the rotary sweep 3 acts to engage and deliver nuts 15 from the ground onto the nut receiving conveyor 10; the latter feeding the nuts onto the cross conveyor 12, which in turn feeds the elevator conveyor 13.

The rotary sweep 3 is of novel construction and operation, which will now be described in detail.

Such rotary sweep 3 comprises a central cross shaft 16 journaled between the sides of the swing frame 4, and circular end plates 17 are fixed on said cross shaft 16 adjacent opposite ends thereof.

A plurality of mounting shafts 18 are secured between the end plates 17 in a circumferential row in which said mounting shafts are evenly spaced.

On each mounting shaft 18 there is a transverse row of finger units, each of said units being indicated at 19. As such finger units are alike, a description of one will suffice for all.

Each finger unit 19 comprises a mounting plate 20 hinged on, or hung from, the corresponding mounting shaft 18 and normally projecting outwardly therefrom.

A plurality of transversely spaced, spring steel fingers 21 are fixed to each mounting plate 20 outwardly of the corresponding mounting shaft 18, and at their outer ends such fingers 21 have tips 22 inclined in the direction of rotation.

Centrally of its ends and adjacent the inner edge each mounting plate 20 includes an attachment ear 23, and a heavy-duty tension spring 24 connects between each ear 23 and the mounting shaft 18 immediately ahead thereof. Each spring 24 is normally substantially unloaded, whereby to maintain the fingers 21 of the corresponding finger unit 19 in generally radiating relation to the cross shaft 16; as, for example, in the position of the uppermost fingers, as in Fig. 3.

The swing frame 4 is adjusted so that the distance between the low point of the end plates 17 and the ground is substantially lesser than the distance which the spring steel fingers 21 normally project beyond the periphery of said end plates. Thus, when the rotary sweep 3 rotates in the same direction as the direction of travel of the machine, the transverse rows of outwardly projecting fingers 21 successively engage and drag the ground. When this occurs the mounting plates 20 are swung about the corresponding mounting shafts 18 in a direction to load the tension springs 24. See the ground engaging fingers shown in full lines in Fig. 3.

As these ground engaging fingers 21 drag along the ground they advance the nuts 15 ahead thereof, and when the leading row of such fingers begins to rise such row escapes the ground with a snap action by reason of the loaded springs 24. This snap action flicks the nuts 15 off the ground and throws them forwardly and upwardly onto the nut receiving conveyor 10. This snap action of the leading transverse row of ground engaging fingers is illustrated in Fig. 3, wherein said leading row, while still in ground engagement, is shown in full lines, while its position after snap action is shown in dotted lines, which dotted-line position is of course the normal position of the fingers.

By reason of the mounting of the fingers 21 on the separately hinged units 19, such fingers when in ground engagement readily follow ground contour, because said units 19 can load the corresponding springs to different extents. This conforming of the fingers to ground contour is well illustrated in the lower portion of Fig. 2.

The particular functioning of the rotary sweep 3 to flick the nuts 15 off another receiving conveyor 10 by snap action of said fingers after ground drag loading thereof is an extremely advantageous feature, and effects the recovery of nuts from the ground in a more expeditious manner than has heretofore been accomplished.

Corresponding teeth 21, in adjacent transverse rows thereof, are staggered relative to each other, whereby to improve the action of the rotary sweep and to assure of any nuts being skipped.

The nut pick-up machine is a practical and reliable implement for the intended purpose, and while its structure is relatively simple, requiring a minimum of servicing or maintenance, it produces excellent results.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent are desired:

A pick up reel comprising a central supporting shaft, a plurality of mounting shafts grouped concentrically around the central shaft, a plurality of plates hinged on each mounting shaft in end to end relation, a group of pick up fingers on each plate normally extending radially outward with respect to the shaft, extension ears on the plates, tension springs connected at one end to the extension ears and at the other ends to the next succeeding mounting shaft, such springs being effective to yieldably maintain the fingers in their normally extending position.

ALFRED D. GOODWIN.

REFERENCES CITED

The following references are of record in the file of this patent:

UNITED STATES PATENTS

| Number | Name | Date |
|---|---|---|
| 930,269 | Conrath | Aug. 3, 1909 |
| 983,662 | White et al. | Feb. 7, 1911 |
| 1,032,124 | Donovan | July 9, 1912 |
| 1,611,919 | Kilborn | Dec. 28, 1926 |
| 1,650,796 | Kellogg | Nov. 29, 1927 |
| 1,939,385 | Burr | Dec. 12, 1933 |
| 2,065,169 | Carpenter | Dec. 22, 1936 |
| 2,362,402 | Reiter | Nov. 7, 1944 |
| 2,431,397 | Harrison | Nov. 25, 1947 |